(12) United States Patent
Yan

(10) Patent No.: US 11,485,656 B2
(45) Date of Patent: Nov. 1, 2022

(54) METHOD FOR TREATING HEAVY METAL WASTEWATER

(71) Applicant: XIAMEN UNIVERSITY OF TECHNOLOGY, Fujian (CN)

(72) Inventor: Bin Yan, Fujian (CN)

(73) Assignee: XIAMEN UNIVERSITY OF TECHNOLOGY, Fujian (CN)

(*) Notice: Subject to any disclaimer, the term of this patent is extended or adjusted under 35 U.S.C. 154(b) by 243 days.

(21) Appl. No.: 16/769,942

(22) PCT Filed: May 27, 2019

(86) PCT No.: PCT/CN2019/088534
§ 371 (c)(1),
(2) Date: Jun. 4, 2020

(87) PCT Pub. No.: WO2020/015459
PCT Pub. Date: Jan. 23, 2020

(65) Prior Publication Data
US 2021/0269340 A1    Sep. 2, 2021

(30) Foreign Application Priority Data

Jul. 17, 2018   (CN) .......................... 201810785696.1

(51) Int. Cl.
| | | |
|---|---|---|
| C02F 3/30 | (2006.01) | |
| B01D 69/02 | (2006.01) | |
| B01D 69/08 | (2006.01) | |
| B01D 71/34 | (2006.01) | |
| C02F 3/12 | (2006.01) | |
| C02F 3/28 | (2006.01) | |
| C02F 101/20 | (2006.01) | |

(52) U.S. Cl.
CPC .............. *C02F 3/301* (2013.01); *B01D 69/02* (2013.01); *B01D 69/08* (2013.01); *B01D 71/34* (2013.01); *C02F 3/1273* (2013.01); *C02F 3/2853* (2013.01); *B01D 2325/02* (2013.01); *C02F 2101/20* (2013.01)

(58) Field of Classification Search
CPC ........... Y02W 10/10; B01D 2311/2688; B01D 69/08; C02F 3/30; C02F 3/2853; C02F 3/301; C02F 2209/10; C02F 2209/08; C02F 2209/04
See application file for complete search history.

(56) References Cited

U.S. PATENT DOCUMENTS

| | | | |
|---|---|---|---|
| 7,597,808 B2 | 10/2009 | Shiotani | |
| 2011/0068058 A1* | 3/2011 | Sun | B01D 63/08 210/206 |
| 2018/0093228 A1 | 4/2018 | Yan et al. | |

FOREIGN PATENT DOCUMENTS

| | | | |
|---|---|---|---|
| CN | 1544351 A | | 11/2004 |
| CN | 2915846 Y | | 6/2007 |
| CN | 101774690 A | | 7/2010 |
| CN | 102260009 B | | 1/2013 |
| CN | 103265151 A | | 8/2013 |
| CN | 103724668 A | * | 4/2014 |
| CN | 103724668 A | | 4/2014 |
| CN | 103936146 B | | 5/2015 |
| CN | 205653227 U | | 10/2016 |
| CN | 107055765 A | | 8/2017 |
| CN | 108911134 A | | 11/2018 |
| CN | 108911136 A | | 11/2018 |
| CN | 108911137 A | | 11/2018 |
| JP | S62102896 A | | 5/1987 |
| JP | 11244877 A | | 9/1999 |
| JP | 2007152179 A | | 6/2007 |
| JP | 2013255919 A | | 12/2013 |
| JP | 2016013537 A | | 1/2016 |
| JP | 2016013537 A | * | 1/2016 |
| JP | 2017164739 A | | 9/2017 |
| KR | 20020094950 A | | 12/2002 |
| KR | 20170014568 A | | 2/2017 |
| WO | 2011059218 A2 | | 5/2011 |

OTHER PUBLICATIONS

Ricordel et al. "Heavy metals removal by adsorption onto peanut husks carbon: characterization, kinetic study and modeling" Separation and Purification Technology 24, 2001, 389-401 (Year: 2001).*
Abdel Salam et al. "A study of the removal characteristics of heavy metals from wastewater by low-cost adsorbents" Journal of Advanced Research, Feb. 2011, 297-303 (Year: 2011).*
Li, Jingmei et al., Decolorization of Dyeing Effluents with A/O Type Sequencing Batch MBR Method, Dyeing & Finishing, No. 3, Feb. 1, 2001, 2009.
Li, Jingmei et al., Influences of HRT on Dyeing Effluents Treatment with A/O Type Sequencing Batch MBR, Dyeing & Finishing, No. 16, 15 Aug. 15, 2009.
Search Report for International Application No. PCT/CN2019/085158 dated Jul. 16, 2019.
English Translation of International Search Report from International Application No. PCT/CN2019/085159 dated Jul. 22, 2019 (2 pages).

(Continued)

*Primary Examiner* — Ryan B Huang
(74) *Attorney, Agent, or Firm* — Calfee Halter & Griswold LLP

(57) ABSTRACT

Disclosed is a method for treating wastewater containing heavy metal. First, the wastewater containing heavy metal is subjected to a homogenization treatment, such that the water quality of the wastewater containing heavy metal from different processes is homogenized. The homogenized wastewater containing heavy metal is subjected to an anaerobic-aerobic circulating treatment in a membrane bioreactor (2), in which heavy metal ions are reduced by the action of microorganisms in the anaerobic treatment process. The membrane bioreactor (2) is filled with a hollow fiber membrane (3) containing a quinone group, which serves as an electron mediator that can accelerate the enzymatic reduction of heavy metal ions during the anaerobic treatment. During the aerobic treatment, the COD and SS in the wastewater are further removed.

1 Claim, 1 Drawing Sheet

(56) References Cited

OTHER PUBLICATIONS

Office Action from U.S. Appl. No. 16/769,914 dated Jul. 21, 2021.
English Translation of International Search Report from International Application No. PCT/CN2019/088534 dated Aug. 9, 2019 (3 pages).

* cited by examiner

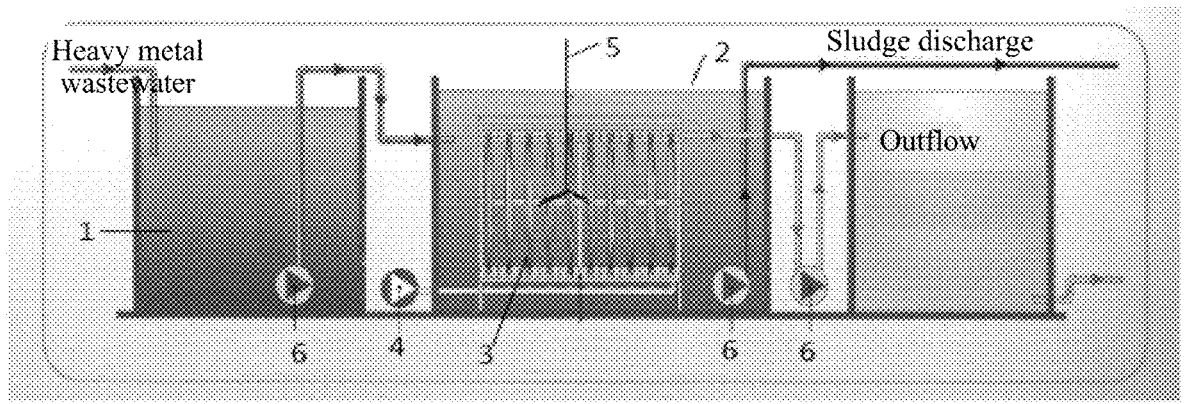

METHOD FOR TREATING HEAVY METAL WASTEWATER

CROSS-REFERENCE TO RELATED APPLICATIONS

The present application is the National Stage of International Application No. PCT/CN2019/088534, filed on May 27, 2019, which claims priority to the Chinese Patent Application No. 201810785696.1, filed with the China National Intellectual Property Administration (CNIPA) on Jul. 17, 2018, and entitled "METHOD FOR TREATING HEAVY METAL WASTEWATER", which are incorporated herein by reference in their entireties.

TECHNICAL FIELD

The present invention relates to the technical field of wastewater treatment, and in particular to a method for treating heavy metal wastewater.

BACKGROUND

Heavy metal wastewater refers to wastewater containing heavy metals discharged from the production process in mining and metallurgy, machinery manufacturing, chemical industry, electronics, instruments and other industries. Heavy metal wastewater (including cadmium, nickel, mercury and zinc, etc.) is one of the most serious industrial wastewater that pollutes the environment and poses the greatest harm to humans. Its quality and quantity are related to the production process. The heavy metals in the wastewater cannot be destroyed by decomposition, but can only be treated by shifting their location and changing their physical and chemical forms. In order to reduce the heavy metal wastewater, the production process needs to be reformed to avoid or reduce the use of heavy or toxic heavy metals, and the heavy metal wastewater needs to be treated locally at the production site (not to be discharged outside the production workshop). Chemical precipitation and ion exchange methods are often used to treat the heavy metal wastewater. After the treatment, if the heavy metals in the wastewater meet the discharge standard, the heavy metal wastewater can be discharged or reused. The heavy metal concentrates formed in the treatment should be recycled or harmlessly treated.

Chemical processes are used to change the morphology of the heavy metals, and remove the heavy metals by precipitation, but they are easy to produce new pollutants. Biological processes are widely used because of low cost and simple operation. They reduce part of the metals to elements while removing organic pollutants in the wastewater, thereby achieving the purpose of removing heavy metals. However, at present, the biological processes have low removal rate of heavy metals, which limits their promotion.

SUMMARY

In order to overcome the above shortcomings of the prior art, the present invention provides a method for treating heavy metal wastewater. This method removes the heavy metals by biological reduction and has high removal rate of heavy metals.

To achieve the above purpose, the present invention provides the following technical solution.

A method for treating heavy metal wastewater includes the following steps:

homogenizing the heavy metal wastewater in an equalization tank; and subjecting the homogenized heavy metal wastewater to circulating anaerobic-oxic treatment in an MBR filled with a quinone-based hollow fiber membrane.

Preferably, the quinone-based hollow fiber membrane in the MBR has a running flux of 10 L/(m$^2$·h) and an average pore size of 0.1 μm.

Preferably, the quinone-based hollow fiber membrane comprises greater than 5% by mass of quinone.

Preferably, a sludge concentration in the MBR is 3,000-4,000 mg/L.

Preferably, the heavy metal wastewater has a hydraulic retention time (HRT) of greater than 10 h in the equalization tank.

Preferably, during the circulating anaerobic-oxic treatment, the time of single anaerobic treatment is 50-70 min.

Preferably, a redox potential in the anaerobic treatment is less than or equal to −400 mV.

Preferably, during the circulating anaerobic-oxic treatment, the time of single oxic treatment is 50-70 min.

Preferably, dissolved oxygen (DO) in the oxic treatment is 1-2 mg/L.

Preferably, the homogenized heavy metal wastewater has an HRT of 5-7 h in the MBR.

The present invention provides a method for treating heavy metal wastewater, including: firstly homogenizing the heavy metal wastewater to balance the water quality of the heavy metal wastewater from different processes; and then subjecting the homogenized heavy metal wastewater to circulating anaerobic-oxic treatment in an MBR. During anaerobic treatment, heavy metal ions are reduced by the action of microorganisms. In the present invention, the MBR is filled with a quinone-based hollow fiber membrane. The quinone in the fiber membrane acts as an electron mediator to accelerate the enzymatic reduction reaction of the heavy metal ions during the anaerobic process, thereby achieving the purpose of efficient removal of heavy metals. The oxic treatment process further removes the chemical oxygen demand (COD) and total suspended solids (SS) in the wastewater, so that the effluent meets a first-level discharge standard. The results of the examples show that by treating the heavy metal wastewater by the method provided by the present invention, the COD in the effluent is less than 30 mg/L, the concentration of the heavy metal ions is less than 0.1 mg/L, and the SS is 0.

BRIEF DESCRIPTION OF DRAWINGS

FIG. 1 is a flowchart of treating heavy metal wastewater according to an example of the present invention.

REFERENCE NUMERALS 1. equalization tank; 2. MBR; 3. quinone-based hollow fiber membrane; 4. aeration device; 5. agitator; and 6. pump.

DETAILED DESCRIPTION

The present invention is further described below with reference to the accompanying drawings and examples.

The present invention provides a method for treating heavy metal wastewater, including the following steps:

homogenize the heavy metal wastewater in an equalization tank; and subject the homogenized heavy metal wastewater to circulating anaerobic-oxic treatment in a membrane bioreactor (MBR) filled with a quinone-based hollow fiber membrane.

The present invention homogenizes the heavy metal wastewater in an equalization tank. The present invention has no special requirement for the source of the heavy metal wastewater, and heavy metal wastewater discharged from the production process of machinery manufacturing, chemical industry, electronics, instruments and other industries can be treated by the method of the present invention. Specifically, the wastewater includes heavy metal ions such as cadmium, nickel, mercury and zinc. In the present invention, in the heavy metal wastewater, the content of heavy metal ions is generally greater than 20 mg/L, the COD content is generally greater than 150 mg/L, and the total suspended solids (SS) is generally greater than 50 mg/L.

In the present invention, the hydraulic retention time (HRT) of the heavy metal wastewater in the equalization tank is preferably greater than 10 h, and more preferably 12-15 h. The present invention has no special requirement for the inflow rate of the heavy metal wastewater, and an inflow rate that can discharge the heavy metal wastewater into the equalization tank for homogenization can be used.

In the present invention, the heavy metal wastewater is homogenized in the homogenization tank to balance the concentration of heavy metal ions, density and COD of the wastewater. The present invention has no special requirement for the volume of the equalization tank. In a specific example of the present invention, the volume of the equalization tank is preferably determined according to the amount of wastewater to be treated.

After the homogenization is completed, the present invention subjects the homogenized heavy metal wastewater to circulating anaerobic-oxic treatment in an MBR. In the present invention, the MBR is an anaerobic-oxic membrane bioreactor (AOMBR). The AOMBR is filled with a quinone-based hollow fiber membrane. The AOMBR is provided with an agitator in the center for agitating during the anaerobic treatment process. The AOMBR is also provided with an aeration device at the bottom for aerating to provide oxygen for the oxic treatment process. In the present invention, the circulation of the heavy metal wastewater between the equalization tank and the MBR is preferably realized by a pump.

In the present invention, the MBR is filled with a quinone-based hollow fiber membrane. The flux of the quinone-based hollow fiber membrane is preferably greater than or equal to 10 L/(m$^2$·h), and more preferably 10-15 L/(m$^2$·h). The quinone-based hollow fiber membrane includes preferably greater than 5%, more preferably 10-15% by mass of quinone. The average pore diameter of the quinone-based hollow fiber membrane is preferably 0.1 μm. In a specific example of the present invention, 1 m$^2$ area of membrane filament filters at least 10 L of wastewater in 1 h. The present invention preferably determines the total area of the hollow fiber membrane according to the amount of the heavy metal wastewater to be treated. The present invention has no special requirement for the source of the quinone-based hollow fiber membrane, and that purchased directly or prepared can be used. In a specific example of the present invention, the quinone-based hollow fiber membrane can specifically be an anthraquinone functionalized polyvinylidene fluoride membrane, which can be prepared according to a method well known to those skilled in the art. The present invention has no special requirement for the filling method of the quinone-based hollow fiber membrane, and a filling method well known to those skilled in the art can be used.

In the present invention, the sludge concentration in the MBR is preferably 3,000-4,000 mg/L, and more preferably 3,500 mg/L. The present invention has no special requirement for the type of the sludge, and sewage treatment sludge well known to those skilled in the art can be used.

The present invention has no special requirement for the inflow rate of the homogenized wastewater in the MBR. In a specific example of the present invention, the specific inflow rate is determined according to factors such as the amount of the wastewater to be treated and the cross-sectional area of an inlet pipe.

In the present invention, the sewage after the anaerobic treatment is firstly subjected to anaerobic treatment and then oxic treatment in the MBR, and the treatment is sequentially cycled. In the present invention, during the circulating anaerobic-oxic treatment, the time of single anaerobic treatment is preferably 50-70 min, and more preferably 60 min. The redox potential in the anaerobic treatment is preferably less than or equal to −400 mV, and more preferably −600 mV to −450 mV. The present invention preferably performs the anaerobic treatment while agitating at the speed of preferably 5 rpm or less, and more preferably 3-4 rpm. In the present invention, the sludge is suspended in the water by agitating to fully contact with the quinone-based hollow fiber membrane, so as to avoid the reduction of the reaction efficiency due to sludge deposition. The present invention preferably provides a hydraulic agitator in the MBR. In order to avoid touching the hollow fiber membrane during the agitating process, the present invention preferably fills the hollow fiber membrane around the MBR and disposes the hydraulic agitator in the center of the MBR.

During the anaerobic treatment process, the enzymes included in the microorganisms in the sludge reduce the heavy metal ions to heavy metal elements. In the anaerobic treatment, the quinone of the hollow fiber membrane acts as a mediator to accelerate the enzymatic reduction reaction of heavy metal ions, increasing the electron transfer rate during the reduction reaction, and achieving the efficient removal of heavy metal ions. In addition, the oxic treatment degrades the remaining organic matter in the heavy metal wastewater, thereby reducing the COD of the wastewater.

In the present invention, the time of single oxic treatment is preferably 50-70 min, and more preferably 60 min. The dissolved oxygen (DO) in the oxic treatment is preferably 1-2 mg/L, and more preferably 1.5 mg/L. The present invention preferably aerates to provide oxygen for the oxic treatment. The aeration process causes the sewage to be agitated, so the oxic treatment process does not need an agitator. The present invention preferably provides an aeration device at the bottom of the MBR. The present invention has no special requirement for the aeration device, and an aeration device well known to those skilled in the art can be used to provide oxygen for the oxic treatment. During the oxic treatment process, the low molecular weight organic matter in the heavy metal wastewater is decomposed into inorganic matter, which further reduces the COD of the wastewater.

In the present invention, the HRT of the homogenized wastewater in the MBR is preferably 5-7 h, and more preferably 6 h. During the HRT, the circulating anaerobic-oxic treatment is performed for more than 3 cycles.

In a specific example of the present invention, the homogenized heavy metal wastewater is preferably first subjected to the anaerobic treatment in the MBR. The aeration device is turned off and the agitator is turned on to perform the anaerobic treatment for 50-70 min. Then the agitator is turned off and the aeration device is turned on to perform the oxic treatment for 50-70 min. Then the anaerobic treatment is performed, and the operations are repeated until the HRT of the homogenized wastewater in the MBR reaches 5-7 h. The wastewater is discharged after the treatment. In the present invention, the wastewater is preferably discharged in the oxic treatment stage. The aeration treatment in the oxic treatment stage causes the membrane filament to be agitated, so the sludge is not easy to adhere to the surface of the membrane filament when the wastewater is discharged. In the anaerobic treatment stage, since the agitating force on the membrane filament is insufficient, the sludge will adhere to the surface of the membrane filament when the wastewater is discharged, causing pollution of the membrane filament and affecting the outflow rate.

The wastewater treatment process of the present invention is shown in FIG. 1. The heavy metal wastewater flows through the equalization tank 1 for homogenization. The homogenized wastewater enters the MBR (AOMBR) 2 for circulating anaerobic-oxic treatment. The MBR is filled with the quinone-based hollow fiber membrane 3. During the anaerobic treatment, the agitator 5 is turned on and the aeration device 4 is turned off. During the oxic treatment, the agitator 5 is turned off and the aeration device 4 is turned on. After the circulating treatment, the wastewater that meets the standard is led through a suction pump to a discharge port of the sewage treatment system for discharge. In the present invention, the heavy metal ions are reduced to heavy metal elements to be precipitated in the sludge and treated together with the sludge in a later stage. The present invention has no special requirement for the treatment method of the sludge in the MBR, and a treatment method well known to those skilled in the art can be used.

The solutions provided by the present invention are described in detail below with reference to the examples, but the examples should not be construed as a limitation to the protection scope of the present invention.

Example 1

In the heavy metal wastewater, the initial COD was 600 mg/L, the initial $Ni^{2+}$ content was 100-150 mg/L, and the initial SS was 200 mg/L.

The heavy metal wastewater was first homogenized in an equalization tank, where the HRT of the heavy metal wastewater was 10 h.

After the treatment by the equalization tank, the heavy metal wastewater entered an AOMBR filled with a membrane filament, which was a quinone-based hollow fiber membrane. The sludge concentration in the AOMBR was 3,000 mg/L. The AOMBR performed anaerobic treatment by hydraulically agitating for 1 h at the redox potential of −450 mV (without aeration). Then the AOMBR performed oxic treatment for 1 by aerating and controlling the DO to be 1 mg/L (without agitation). In the oxic treatment process, the HRT was 6 h, and the wastewater was discharged through the membrane filament after meeting the standard.

The COD, $Ni^{2+}$ content and SS in the heavy metal wastewater after treatment were tested, as shown in Table 1.

TABLE 1

Changes in the quality of heavy metal wastewater before and after treatment

| Process | | AOMBR |
|---|---|---|
| Inflow | COD (mg/L) | 600 |
| | $Ni^{2+}$ (mg/L) | 100-150 |
| | SS (mg/L) | 200 |
| Outflow | COD (mg/L) | <30 |
| | $Ni^{2+}$ (mg/L) | <0.1 |
| | SS (mg/L) | 0 |

Table 1 shows that the $Ni^{2+}$ content, COD and SS in the untreated heavy metal wastewater were very high, and after the treatment by the AOMBR, the $Ni^{2+}$ content was less than 0.1 mg/L, the COD was less than 30 mg/L, and the SS was completely removed. The effluent met a first-level discharge standard. It can be seen that the method for treating heavy metal wastewater provided by the present invention achieves a high removal rate of heavy metal ions and excellent removal effect on the COD and SS.

Example 2

In the heavy metal wastewater, the initial COD was 310 mg/L, the initial $Zn^{2+}$ content was 40 mg/L, and the initial SS was 50 mg/L.

The heavy metal wastewater was first homogenized in an equalization tank, where the HRT of the heavy metal wastewater was 12 h.

After the treatment by the equalization tank, the heavy metal wastewater entered an AOMBR filled with a membrane filament, which was a quinone-based hollow fiber membrane. The sludge concentration in the AOMBR was 3,000 mg/L. The AOMBR performed anaerobic treatment by hydraulically agitating for 50 min at the redox potential of −400 mV (without aeration). Then the AOMBR performed oxic treatment for 50 min by aerating and controlling the DO to be 2 mg/L (without agitation). In the oxic treatment process, the HRT was 5.5 h, and the wastewater was discharged through the membrane filament after meeting the standard.

The COD, $Zn^{2+}$ content and SS in the heavy metal wastewater after treatment were tested, as shown in Table 1.

TABLE 2

Changes in the quality of heavy metal wastewater before and after treatment

| Process | | AOMBR |
|---|---|---|
| Inflow | COD (mg/L) | 310 |
| | $Zn^{2+}$ (mg/L) | 40 |
| | SS (mg/L) | 50 |
| Outflow | COD (mg/L) | <30 |
| | $Zn^{2+}$ (mg/L) | <0.1 |
| | SS (mg/L) | 0 |

Table 2 shows that after the heavy metal wastewater was treated, the COD was less than 30 mg/L, the $Zn^{2+}$ content was less than 0.1 mg/L, and the SS was completely removed. The effluent met a first-level discharge standard. It can be seen that the method for treating heavy metal wastewater provided by the present invention achieves a high removal rate of the heavy metal ions and excellent removal effect on the COD and SS.

The above description of the examples is intended to help understand the method and core idea of the present invention. It should be noted that, several improvements and modifications may be made by persons of ordinary skill in the art without departing from the principle of the present invention, and these improvements and modifications should also be considered within the protection scope of the present invention. Various modifications to these examples are readily apparent to persons skilled in the art, and the generic principles defined herein may be practiced in other examples without departing from the spirit or scope of the invention. Thus, the present invention is not limited to the examples shown herein but falls within the widest scope consistent with the principles and novel features disclosed herein.

What is claimed is:

1. A method for treating heavy metal wastewater, comprising the following steps:
   homogenizing the heavy metal wastewater in an equalization tank; and
   subjecting the homogenized heavy metal wastewater to circulating anaerobic-oxic treatment in a membrane bioreactor (MBR) filled with a quinone-based hollow fiber membrane,
   wherein the quinone-based hollow fiber membrane comprises 10-15% by mass of quinone,
   the quinone-based hollow fiber membrane in the MBR has a running flux of 10 L/(m$^2$·h) and an average pore size of 0.1 μm,
   a sludge concentration in the MBR is 3,000-4,000 mg/L,
   the heavy metal wastewater has a hydraulic retention time (HRT) of greater than 10 h in the equalization tank,
   during the circulating anaerobic-oxic treatment, the time of single anaerobic treatment is 50-70 min,
   a redox potential in the anaerobic treatment of the circulating anaerobic-oxic treatment is less than or equal to −400 mV,
   during the circulating anaerobic-oxic treatment, the time of single oxic treatment is 50-70 min,
   dissolved oxygen (DO) in the oxic treatment of the circulating anaerobic-oxic treatment is 1-2 mg/L,
   the homogenized heavy metal wastewater has a hydraulic retention time (HRT) of 5-7 h in the MBR.

* * * * *